(12) United States Patent
Komminoth

(10) Patent No.: US 10,504,119 B2
(45) Date of Patent: Dec. 10, 2019

(54) SYSTEM AND METHOD FOR EXECUTING REMOTE ELECTRONIC AUTHENTICATION

(71) Applicant: CUSTOMBIKE AG, Maienfeld (CH)

(72) Inventor: Marcel F. Komminoth, Maienfeld (CH)

(*) Notice: Subject to any disclaimer, the term of this patent is extended or adjusted under 35 U.S.C. 154(b) by 90 days.

(21) Appl. No.: 15/631,910

(22) Filed: Jun. 23, 2017

(65) Prior Publication Data

US 2017/0372320 A1  Dec. 28, 2017

Related U.S. Application Data

(60) Provisional application No. 62/353,695, filed on Jun. 23, 2016.

(51) Int. Cl.
| | |
|---|---|
| *G06F 7/04* | (2006.01) |
| *H04L 9/32* | (2006.01) |
| *G06F 21/00* | (2013.01) |
| *G06K 9/00* | (2006.01) |
| *G06Q 20/40* | (2012.01) |
| *H04L 29/06* | (2006.01) |
| *G06F 21/32* | (2013.01) |

(Continued)

(52) U.S. Cl.
CPC ..... *G06Q 20/40145* (2013.01); *G06F 21/305* (2013.01); *G06F 21/32* (2013.01); *G06K 9/00288* (2013.01); *G06Q 20/32* (2013.01); *H04L 63/0861* (2013.01); *G06K 9/00255* (2013.01)

(58) Field of Classification Search
CPC ............. G06Q 20/40145; G06Q 20/32; G06F 21/305; G06F 21/32; H04L 63/0861; G06K 9/00288; G06K 9/00255

USPC ........... 726/6, 5, 28; 713/168, 186; 382/115, 382/117, 118
See application file for complete search history.

(56) References Cited

U.S. PATENT DOCUMENTS

| | | | |
|---|---|---|---|
| 7,027,617 B1 | 4/2006 | Frischholz | |
| 7,308,581 B1 * | 12/2007 | Geosimonian | .......... G06F 21/32 713/182 |

(Continued)

FOREIGN PATENT DOCUMENTS

| | | |
|---|---|---|
| DE | 19901881 A1 | 7/2000 |
| DE | 19906388 A1 | 8/2000 |

(Continued)

*Primary Examiner* — Aravind K Moorthy
(74) *Attorney, Agent, or Firm* — Browdy and Neimark, P.L.L.C.

(57) ABSTRACT

The remote electronic authentication method uses an electronic communication device (20) with a camera (21) and an authentication related server computer (30). In a connecting step the communication device (20) of the user is connected with the server computer via a communication line (40) and transmits image data sequences taken by the camera (21) to the server computer (30) which then identifies image portions of the acquired data stream related to an identity document shown in the image data sequences as well as image portions related to the head of a user at the user computer (20) in the same image data sequences. A comparison is made between an image of a head in the image related to the identity document and the image of the head of the user and a decision proposal is issued relating to identity of the heads from the two acquired image portions.

8 Claims, 2 Drawing Sheets

(51) Int. Cl.
  *G06F 21/30* (2013.01)
  *G06Q 20/32* (2012.01)

(56) References Cited

U.S. PATENT DOCUMENTS

| | | |
|---|---|---|
| 2003/0139994 A1 | 7/2003 | Jones |
| 2004/0010720 A1* | 1/2004 | Singh .................... H04H 20/82 709/224 |
| 2005/0129282 A1 | 6/2005 | O'Doherty et al. |
| 2007/0098225 A1 | 5/2007 | Piccionelli et al. |
| 2009/0154813 A1 | 6/2009 | Baxter et al. |
| 2012/0084569 A1 | 4/2012 | Feller et al. |
| 2012/0106805 A1 | 5/2012 | Shuster |
| 2012/0143760 A1 | 6/2012 | Abulafia et al. |
| 2012/0180115 A1 | 7/2012 | Maitland |
| 2012/0252411 A1* | 10/2012 | Johnsgard .......... G07C 9/00158 455/411 |
| 2014/0052636 A1* | 2/2014 | Mattes ................. G06Q 20/409 705/44 |
| 2015/0379143 A1* | 12/2015 | Niu ..................... G06F 17/3048 707/710 |
| 2016/0241531 A1* | 8/2016 | Loughlin-Mchugh ........................ H04L 63/08 |
| 2016/0275518 A1* | 9/2016 | Bowles .............. G06K 9/00087 |
| 2017/0019400 A1* | 1/2017 | Drolshagen ......... H04L 63/0861 |
| 2018/0176017 A1* | 6/2018 | Rodriguez .............. H04L 63/08 |

FOREIGN PATENT DOCUMENTS

| | | |
|---|---|---|
| DE | 102004056007 A1 | 5/2006 |
| EP | 1152592 A1 | 11/2001 |
| EP | 2174796 A1 | 4/2010 |
| EP | 2437186 A1 | 4/2012 |
| GB | 2501362 A | 10/2013 |
| WO | 2005008566 A1 | 1/2005 |

* cited by examiner

SYSTEM AND METHOD FOR EXECUTING REMOTE ELECTRONIC AUTHENTICATION

TECHNICAL FIELD

The present invention relates to a system and method for executing remote electronic authentication and financial payment services.

PRIOR ART

A system for executing remote electronic notarization and signatory verification and authentication is known from US 2009/327144. The primary function of this system invention is to interface/interlink human legal activity with electronic and biometric computer components to execute remote electronic notarization via satellite network kiosk or on-line web application.

There are also numerous certification systems, especially for financial transactions as e.g. CN 103 544 598 A, in which the user is sitting in front of a client computer using a fingerprint acquisition module and a communication module, with which said biometric information is transferred to the server at the financial institution and the finger print is checked to enable a reliable financial transaction.

CN 102 984 157 discloses a similar method, where human face data of persons are stored on a server and in order to access a client computer the client terminal operation system is only opened after identification of the human face, when compared to the human face data, stored on the server computer.

U.S. Pat. No. 7,991,388 B1 discloses a method and system for authenticating an account holder allowing for real-time authentication with multiple procedures to prevent fraud and spoofing of the authentication process. Said method and system involves the user photographing himself or herself for facial recognition verification, determination of location by cell phone tower verification, and a PIN preferably sent by SMS text message directly the account holder's mobile phone.

All these prior art approaches start from the assumption that the user has provided credentials to the authenticating system and is subsequently identified by the system, and the aim is to allow an already recognized user to access the system.

SUMMARY OF THE INVENTION

Based on this prior art it is an aim of the present invention to provide a system and method for executing remote electronic authentication without providing initial secure credentials to the authenticating institution.

It is a further object to provide a remote life onboarding and therefore opening of an account with a financial or similar institution which have authentications processes in use.

This object is addressed, inter alia, with a method and system according to the independent claims.

A system for executing remote electronic authentication comprises a user computer/mobile device, an user image acquisition device, and optionally an user input device; an authentication related server computer, optionally a server related database, a server related display, and a server input device. Then the user computer can be connected with the server computer with a communication line. The user computer is adapted to retrieve images and video sequences taken by the user image acquisition device and transmits them to the authentication related server computer. They are optionally stored in a server related database. The server computer is adapted to identify image portions related to an identity document in the image and/or video sequences and is adapted to identify image portions related to the head of a user at the user computer in the image and/or video sequences. Both derived information with a facial recognition system are prepared for display and optionally storage. The system is further adapted to compare an image of a head in the image related to the identity document with the image of the head of the user and to issue a decision if the image of the head in the identity document is related to the image of the head of a user as retrieved as part of the acquired images and video sequences, being represented on the server related display together with said image portions, supporting an authenticating person at the server input device in its authentication decision.

Such a system can then store—upon an authentication decision—the acquired image and video information in the server related database for verification and as evidence of the check.

Such an authentication can be the basis for a subsequently allowed or denied remote request from the user, such as opening a bank account or requesting official services where the law requires a quasi-personal identification.

A method for executing remote electronic authentication using a user computer/mobile device with an user image acquisition device and using an authentication related server computer having a server related display and a server input device comprises a series of steps. Within a connecting step, the user computer is connected with the server computer via a communication line. In an image acquisition step the user computer retrieves images and video sequences taken by the user image acquisition device and transmits this information to the authentication related server computer. In an data acquisition step the server computer identifies image portions of the acquired data stream related to an identity document shown in the image and/or video sequences. In a video recognition system step, image portions related to the head of a user at the user computer in the image and/or video sequences are identified. In a comparison step an image of a head in the image related to the identity document with the image of the head of the user are compared and a decision proposal is issued if the image of the head in the identity document is related to the image of the head of a user as retrieved as part of the acquired images and video sequences.

The acquired image information of the head of the user can be represented beside the acquired image information of the image of the head of the user from the identity document on the display for easy reference for the authenticating person.

The data acquisition step can comprise the acquisition of image information of the head represented on the document page as well as the acquisition of image information of alphanumerical information represented on the document page.

The acquired image information of the retrieved alphanumerical information can be represented beside the derived character-coded alphanumerical information and optionally beside acquired transmitted image alphanumerical information from the user.

Usually, a user wishing to open an account with a financial or similar institution is obliged to prove his identity. Such an identity check is usually performed when the user is presenting himself personally at the bank premises and shows his identity card, his passport or other identification part of an official recognized organization. This can also be e.g. a driver's license.

In remote areas it is cumbersome to perform such steps and long ways have to be travelled, in order to open such an account, since there are simply no institutions with personal around. Furthermore, this personal checking of credentials usually only allows big financial or similar institutions, having a plurality of agencies, to improve their client base. Smaller institutions being usually only present in metropolitan areas are excluded from this market. It is therefore a further aim of the invention to improve the market access for financial or similar institutions.

The solution according to the invention is offered as an open platform to be used in a multi-tenant approach (incl. markets, industries), segregation of the buyer/seller per business entity.

The identification process of the client occurs via a live streaming of the client and uploaded documents to the clients account. Additionally, each live stream will be recorded so that officials can later on control the authentication process, whereas, when a client shows a document, which might be copied to be in the file, nobody has further knowledge about the person, who presents that document.

Furthermore, it is possible to have additional questions answered to allow the authorization to open an account. Such a solution allows better anti-money laundering and anti-terroristic activities.

Usually, legal requirements necessitates an additional user check so that somewhere in the transaction or during the entire transaction a person at the server computer 30 is attending the session and validates the decision of the face recognition system and the optional optical character recognition system. It is known from the prior art to have automatic identity border controls, wherein a user is requested to initially scan his electronic passport, then presents himself in front of a camera to be compared with the biometric information stored on the passport. Said identification recognition system is based on the digital numeric data of the biometric data stored in the electronic chip and is not based on the image represented on the passport page. The invention therefore allows to have the same functionality as state authorities reading biometric passports, without having the need to access the chip in the passport.

It is a further advantage of the present invention that the data acquisition step is monitored and stored in connection with the opened account, whereas in normal identity checking situations, these data are not stored and only the visual check of the officer of the financial or similar institution validates their identity.

Further embodiments of the invention are laid down in the dependent claims. All prior art documents only allow such a check of an already known user but none of the prior art documents handle the problem of initial identification of the user.

BRIEF DESCRIPTION OF THE DRAWINGS

Preferred embodiments of the invention are described in the following with reference to the drawings, which are for the purpose of illustrating the present preferred embodiments of the invention and not for the purpose of limiting the same. In the drawings.

DESCRIPTION OF PREFERRED EMBODIMENTS

Figure 1:
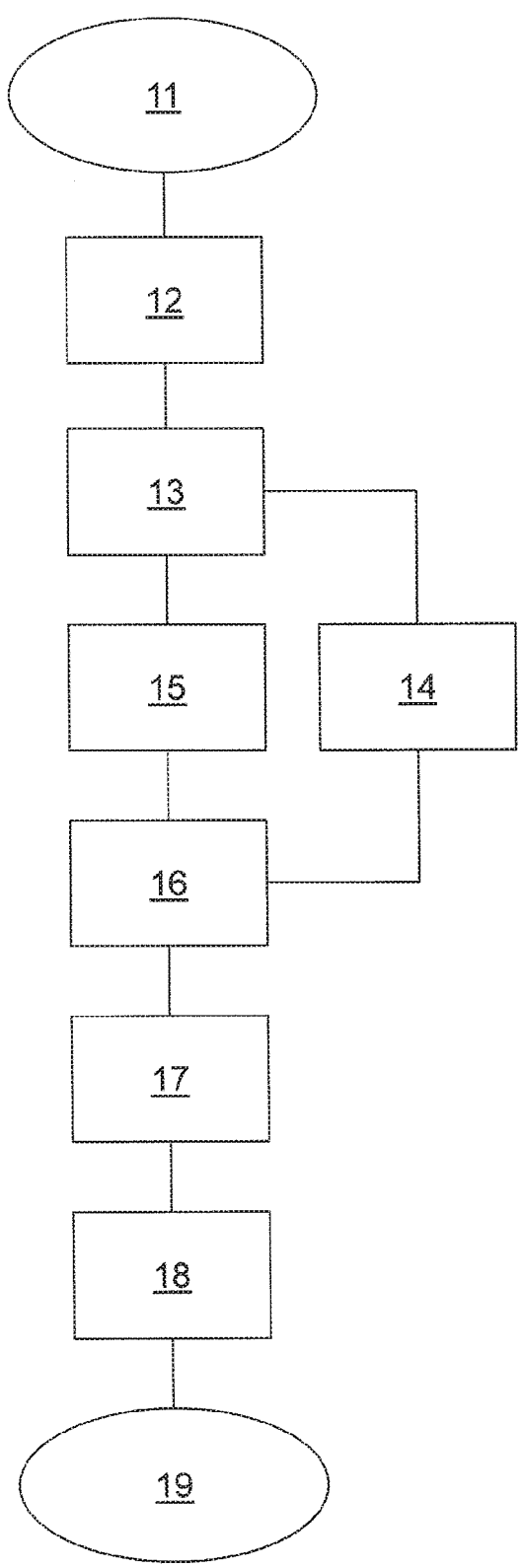
FIG. 1 shows a flowchart of an authentication process according to an embodiment of the present invention.
Figure 2:
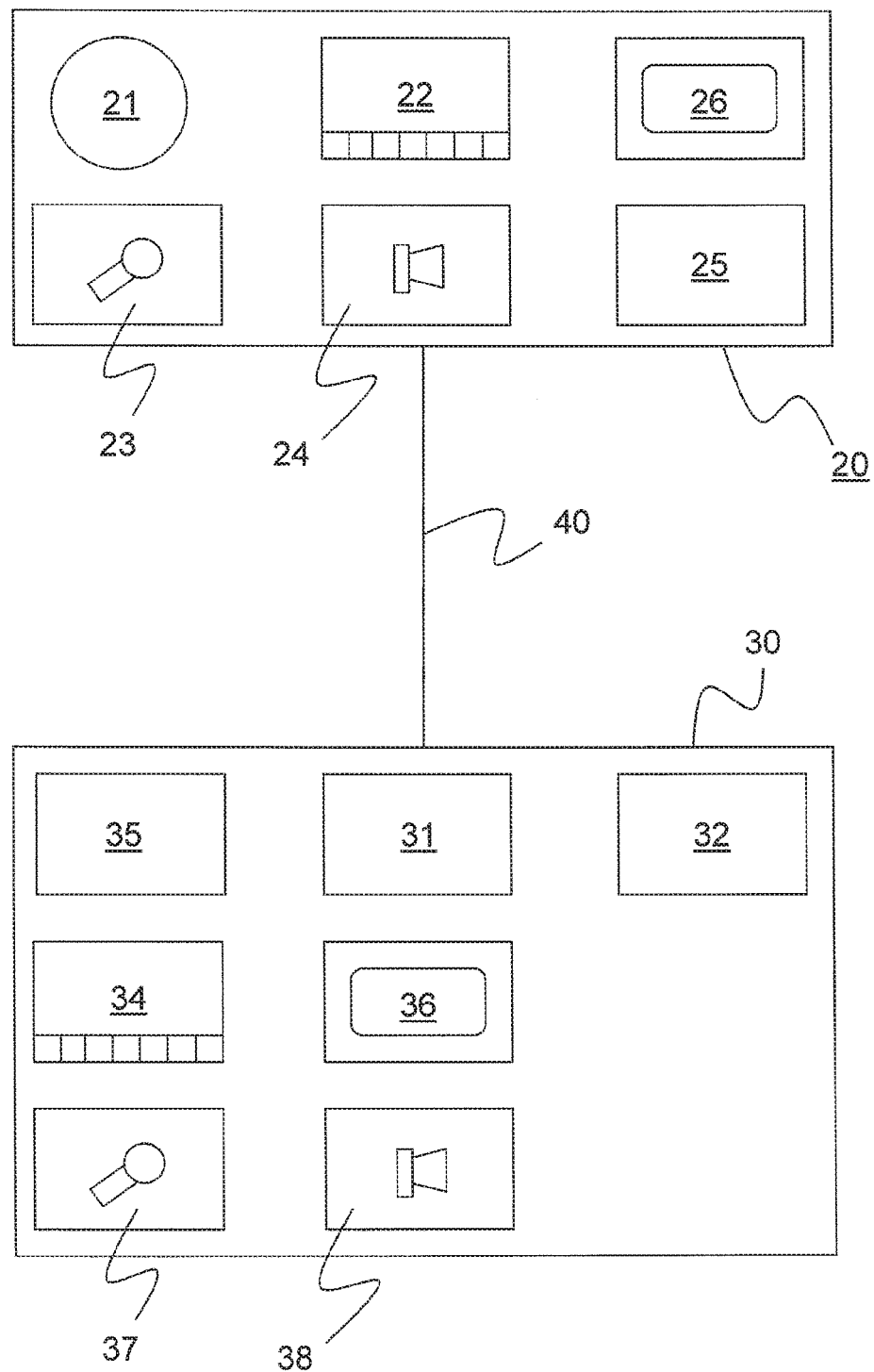
FIG. 2 shows an embodiment of system components on the client side for use in connection with a method of FIG. 1.

FIG. 1 shows a flowchart 10 of an authentication process according to an embodiment of the present invention. FIG. 2 shows an embodiment of system components on the client side for use in connection with a method of FIG. 1.

The opening of an account is performed according to the flow chart of FIG. 1 and use of system components according to FIG. 2.

The user at the client station is using a client computer/mobile device 20 connected with a camera 21 adapted to take a livestream or a screenshot of the environment around the user. The computer 20 is further connected to a keyboard 22 and/or other pointing devices to enter commands to the processor of the computer 20. Preferably, the computer 20 having a processor 25 is connected with a microphone 23 and a loudspeaker 24 in order to have an acoustic connection with the person sitting at the server computer 30. Information is displayed on a screen 26.

The user sitting in front the client computer 20 having e.g. a webcam 21 and a keyboard 22 calls the authentication institution, having a server computer 30 with a processor 35 and different additional IT systems as a personal information database 31 for storing the personal information of a user, an image data base 32 storing either screen captures and/or as well as video and optionally also sound during the session. Of course the server computer 30 has human machine interface elements as a keyboard 34 and a screen 36. When audio information is to be retrieved at the server computer 30, then additional elements like microphone 37 and a loudspeaker 38 are provided at the server.

The client computer 20 can be a desktop with the mentioned additional components or it can be a smartphone or tablet where all these functions are usually incorporated in the client computer.

User computer 20 and sever computer 30 are usually connected to the internet via communication line 40. Of course, communication line 40 is usually e.g. an internet based communication where the communication interfaces are integrated within the devices 20 and 30.

The user starts the session using his computer 20 with a session start 11. A connection with the server computer 30 is initialized and the user is optionally requested to enter or transmit personal data, which data acquisition step 12 can be done in a web application by personal input or through an upload of predefined data sheets, which can be a spreadsheet of a known application or an XML structured file. The server system 30 checks the data for completeness in all fields, which comprises name, christian name, date of birth, number and type of identity documents as well as validity of same.

After uploading the documents the user is filmed in the image acquisition step 13 with said webcam 21 and this information is preferably stored. It is also possible to use the transmitted data to extract image date of the user in a facial data acquisition step 14. The user is either in parallel or later on or earlier requested to hold one or more pages of his identity document in front of the webcam 21 in a document image acquisition step 15. This includes at least the page with the image of the head of the user, but can also include further pages of information. It is possible that a picture in picture approach is used so that the image of the head of the user together with the document to be taken by the webcam 21 is shown on a part of the screen 26 with the user.

The server system 30 acquires this data transmitted via the communication line 40 and the video recognition system 16 scans the images for data, which are included in the previously provided data for consistency. The facial data acquisition step 14 is done during part or the entire acquisition of data and/or in parallel to the document image acquisition step 15.

In a different embodiment, the data acquisition step 12 is skipped, when the recognition system 16 acquires these personal data on the knowledge of their position on the security document, through checking the acquired image of the document page.

It is preferred that the server computer 30 has already started the comparison when the images are taken during the steps 13, 14 and 15, since the acquisition relates to video signals. These previous steps can be used over time to improve the resulting image of the head of the user and/or of the information retrieved from the document which is shown in the webcam 21 with the usual jitter. Such image stabilization programs are known from prior art. Then, in the comparison step 17 its internal face recognition program the server computer 30 is comparing the image of the user's head from the webcam 21 image with the image printed on the identity card from the same webcam 21 image sequence.

The program server computer 30 then releases an opinion of identity or non-identity between the two items on the screen 36 in an image representation step 18, preferably together with a still image or an improved still image of the document as shown by the user and the head of the user.

This allows an authenticating person on the side of the server computer 30 to look at the screen 26, either online or time-shifted, and to have said information on said screen 26 or part of the screen. Part of the screen can also mean that the authenticating person has two or more screens, e.g. one screen with the live image of the web cam 21 of the user, one screen with the still image as acquired and processed by the recognition system 16 together with the comparison information flag (identity/non-identity) and the further information of the user necessary for authentication or relating to the intent of the user performing the authentication e.g. opening a bank account, requesting official services from a public administration etc.

The solution can be implanted in JAVA, but other software can be used. The streaming technology over communication line 40 can be encoded based on e.g. the H264 standard, but other coding can be used. The image transformation is preferably accompanied by a checking and texting application.

In other words, the live data acquired throughout the session or a still photograph at a specific point in time during the session of the user head and of the data page with a user head image of the identification document of the user are taken together or one after the other and pre-compared in comparison step 17 to provide in the image representation step 18 to the representation of the image of the user head, the image from the identity card together with an indication of identity provided by the software program. Additionally further personal information from the datapage of the document can be retrieved by optical character recognition and presented as well, either as is or in combination with manually entered data via keyboard 22 or uploaded from the client computer 20.

Then the authenticating person at the server computer 30 makes the decision in decision step 19, if the documents show the necessary identity to perform the requested act as opening a bank account or an official service for which a personal or a remote controlled presence is required according to the law or subsequent regulations.

The advantage is also based on the possibility for the authenticating person to receive live video images and is supported by a facial recognition program to indicate possible differences between the user person in question and the alleged identity document shown. The relevant data can be stored and retrieved later on for a further check, if considered necessary.

LIST OF REFERENCE SIGNS

| | |
|---|---|
| 10 | flowchart |
| 11 | session start |
| 12 | data acquisition step |
| 13 | image acquisition step |
| 14 | facial data acquisition step |
| 15 | document image acquisition step |
| 16 | video recognition system |
| 17 | comparison step |
| 18 | image representation step |
| 19 | decision step |
| 20 | client computer |
| 21 | webcam |
| 22 | keyboard |
| 23 | microphone |
| 24 | loudspeaker |
| 25 | processor |
| 26 | screen/display |
| 30 | server computer |
| 31 | personal information database |
| 32 | image data base |
| 34 | keyboard |
| 35 | processor |
| 36 | screen/display |
| 37 | microphone |
| 38 | loudspeaker |
| 40 | communication line |

The invention claimed is:

1. A system for executing remote electronic authentication comprising:
   a user computer,
   a user image acquisition device,
   an authentication related server computer,
   a server related display,
   a server input device,
   wherein the user computer can be connected with the server computer with a communication line,
   wherein the user image acquisition device is adapted to take images and video sequences that comprise display details comprising an identity document as well as a head of a user of the system, wherein the user computer is adapted to retrieve the images and video sequences taken by the user image acquisition device and to transmit them to the authentication related server computer, wherein the server computer is adapted to identify image portions related to the identity document in a predetermined image and/or video sequences, is adapted to identify image portions related to the head of the user in the same predetermined image and/or video sequences and is further adapted to compare an image of a head in the image related to the identity document with the image of the head of the user and to issue a decision if the image of the head in the identity document is related to the image of the head of a user as retrieved as part of the acquired predetermined images and video sequences, being represented on the server related display together with said image portions, supporting an authenticating person at the server input device in its authentication decision.

2. The system according to claim 1, wherein the authentication related server computer comprises a server related database and wherein upon an authentication decision the acquired image and video information is stored in the server related database.

3. The system according to claim 1, wherein the authentication is the basis for a subsequently allowed or denied remote request from the user.

4. The system according to claim 1, wherein the user computer comprises a user input device.

5. method for executing remote electronic authentication using a user computer with an user image acquisition device and using an authentication related server computer having a server related display and a server input device, wherein in a connecting step the user computer is connected with the server computer via a communication line, wherein in an image acquisition step the user computer retrieves images and video sequences taken by the user image acquisition device and transmits this information to the authentication related server computer, wherein the images and video sequences taken by the user image acquisition device comprise display details comprising an identity document as well as a head of a user, wherein in an data acquisition step the server computer identifies image portions of the acquired data stream related to the identity document shown in a predetermined image and/or video sequences, identifies in a video recognition system step image portions related to the head of the user at the user computer in the same predetermined image and/or video sequences, and compares an image of a head in the image related to the identity document with the image of the head of the user and issues a decision proposal if the image of the head in the identity document is related to the image of the head of a user as retrieved as part of the acquired images and video sequences.

6. The method according to claim 5, wherein acquired image information of the head of the user is represented beside the acquired image information of the image of the head of the user from the identity document.

7. The method according to claim 5, wherein the data acquisition step comprises the acquisition of image information of the head represented on the document page and comprises acquisition of image information of alphanumerical information represented on the document page.

8. The method according to claim 7, wherein acquired image information of the alphanumerical information from the predetermined image and video sequence is represented beside the derived character-coded alphanumerical information and optionally beside acquired transmitted image alphanumerical information from the user.

* * * * *